Patented Oct. 8, 1946

2,408,975

UNITED STATES PATENT OFFICE 2,408,975

PROCESS FOR THE SEPARATION OF ORGANIC BASES

Karl Henry Engel, West Englewood, N. J., assignor, by mesne assignments, to Allied Chemical & Dye Corporation, a corporation of New York No Drawing. Application July 19, 1940, Serial No. 346,347

15 Claims. (Cl. 260—290)

This invention relates to the separation of organic bases from mixtures of the same, particularly the isolation of individual bases from mixtures of isomeric or homologous bases of coal tar origin.

Organic bases are generally extracted from crude coal tar oils with aqueous solutions of a mineral acid, especially sulfuric acid, and are liberated from the acid solutions by addition of alkali hydroxide or carbonates. The bases thus obtained consist of a variety of isomeric and homologous amines; for example, such a mixture may contain heterocyclic bases such as pyridine and its homologs, quinoline, isoquinoline and their homologs, acridine, and primary aromatic amines such as aniline and its homologs. The mixtures as such have found limited practical application and are of relatively low economic value. The individual bases, however, are valuable and find use in the preparation of derivatives, especially pharmaceutical products and dyes. The requirements for purity in these fields are generally extremely severe.

The means available for resolution of mixtures of such bases have been limited and unsatisfactory. Fractional distillation, the obvious method of separation, is unsatisfactory because the usual base mixture contains a large number of isomers and homologs close to each other in boiling point, in fact frequently having almost identical boiling points.

Methods of separation depending upon fractional crystallization of the more common salts such as the chloride and sulfate from aqueous solutions are well known. Generally such salts are highly soluble in water and outstanding differences in solubilities of close boiling isomers or homologs are rare. Isolation or purification of individual bases by fractional crystallization of such salts is extremely cumbersome or insufficiently sharp to obtain compounds of a purity demanded in industry. Chlorates, picrates, ferrocyanides of bases and addition compounds of bases with mercuric chloride or zinc chloride have been used for separation of base mixtures, but such methods for the most part fail to give sharp separation or present other drawbacks such as explosive hazards, toxicity and prohibitive cost, and are not in commercial use.

It is an object of this invention to provide a commercially attractive process for separating organic bases from mixtures thereof, particularly from the naturally occurring mixtures of isomeric and homologous bases of coal tar origin, whereby a number of bases which heretofore could not be satisfactorily separated from their close isomers and homologs may be separated.

I have discovered that a separation of nitrogen bases present in a mixture of coal tar nitrogen bases may be brought about by forming a phosphate of one or more of the bases in such a mixture and separating from the resulting mixture nitrogen base phosphate thus formed. A nitrogen base phosphate thus formed may be converted to the free amine by treatment with alkali. My process involving the separation of nitrogen bases as phosphates rather than free amines is based on my discovery that coal tar nitrogen bases in general form phosphates corresponding to a type formula base.$H_3PO_4$, which for the most part give clean, well-defined crystals of favorably low solubility and with marked differences in solubilities in other tar bases, in water, or in certain organic solvents.

The formation of the nitrogen base phosphates may be carried out, for example, by adding phosphoric acid to the coal tar base mixture with or without a solvent or diluent present, the phosphoric acid being added in amount sufficient to form the phosphates of one or more of the bases present. As more fully explained hereinafter, phosphoric acid may be added in amount sufficient to neutralize the base mixture, and several or all bases present may react with the phosphoric acid to form a mixture of solid phosphates, which mixture is then treated further to isolate individual bases; or by proper crystal inoculation a single base-phosphate may be made to precipitate upon treatment with phosphoric acid while other base-phosphates remain liquid, in the form of a supersaturated solution or supercooled liquid; or, in accordance with my preferred method, phosphoric acid may be added in a limited, predetermined optimum amount to form only a single base-phosphate which precipitates, leaving in the mother liquor free bases which have not reacted with phosphoric acid.

The formation and precipitation of the phosphates may be brought about in the liquid coal tar base mixture itself, particularly where the precipitate is not voluminous. It is generally advantageous, however, to add a diluent to the coal tar base mixture; suitable diluents include methanol, ethanol, higher alcohols such as propanol and butanol, water, and hydrocarbon solvents such as benzene and toluene. Higher alcohols and hydrocarbons are advantageous in certain cases as diluents for heavy crystal masses, or to wash uncombined bases from base-phosphate crystal surfaces. Water has been found advantageous for precipitation of certain of the nitrogen base-phosphates such as quinaldine phosphate, acridine phosphate and primary aromatic amine phosphates since in the tar base fractions where these substances predominate other base-phosphates present are readily soluble in water. Methanol and ethanol, however, are the preferred dilution vehicles for the process of my invention; they readily dissolve uncombined bases as well as non-crystallizing base-phosphates, and a number of the crystalline base-phosphates have appropriate solubility characteristics in these liquids to facilitate separation and isolation.

I have found it advantageous to form the phosphates by the addition of phosphoric acid to the base mixture or its solution. Mono- or di-sodium phosphate with the equivalent sulfuric acid may be used, however, instead of the more expensive free phosphoric acid; that is, the phosphoric acid may be formed in situ. A soluble base-phosphate, obtained as a by-product in treating a base mixture with phosphoric acid in accordance with my invention, may also be used to precipitate an insoluble base-phosphate from a succeeding batch; the soluble base-phosphate is sufficiently unstable that its use is substantially equivalent to the use of free phosphoric acid. When phosphoric acid is employed, its concentration may vary within wide limits ranging from dilute aqueous solution to acids of practically 100% concentration of orthophosphoric acid. When it is desired to carry out the precipitation in a non-aqueous medium, the use of dilute aqueous phosphoric acid is, of course, avoided. Commercially available phosphoric acid containing from 75% to 85% acid has been found satisfactory from a standpoint of cost as well as product yield.

As above indicated, the process of my invention is employed to separate nitrogen bases present in a mixture of coal tar nitrogen bases. These bases occur naturally in coal tar, and mixtures thereof are ordinarily recovered from the coal tar. The expression "coal tar" is used in the specification and claims in a generic sense to include coal tar; oils obtained therefrom; oils obtained in the high or low temperature carbonization or gasification of coal, such for example as drip oil and coke oven light oils; water-gas tar and water-gas tar oils.

The coal tar bases which may be separated by the process of my invention include all the organic nitrogen bases present in appreciable quantity in a coal tar base mixture; inorganic bases such as ammonia are not included. These bases are amines and include such compounds as pyridine, quinoline, isoquinoline, acridine, aniline, and homologs of these compounds. As examples of amines present in coal tar base mixtures which may be treated by the process of my invention there may be mentioned: pyridine, 2-picoline, 3-picoline, 4-picoline, 2:3-lutidine, 2:4-lutidine, 2:6-lutidine, 2:4:6-collidine, quinoline, isoquinoline, quinaldine, acridine, aniline and the toluidines. Mixtures of these same amines may also be obtained from other sources, e. g. may be prepared synthetically, and my invention contemplates the separation of amines from such mixtures regardless of their origin. The terms "coal tar base," or "coal tar nitrogen base," therefore, as used in the specification and claims, are merely descriptive of the types of bases which may be treated by the process of my invention and are not intended to denote the actual origin of the bases. I have found the process of my invention particularly advantageous to treat mixtures of organic bases of coal tar origin; accordingly the expression "mixtures of organic bases of coal tar origin" is used in the claims to denote a mixture of bases actually derived from coal tar.

In practicing my invention, the base mixture to be treated may contain a very large number of individual bases. Thus it has been found possible to precipitate pure quinaldine phosphate from a total mixture of all bases extracted from a typical crude coal tar oil. Generally, however, such a procedure is undesirable since wide mixtures may contain each component base in too small proportions, making it difficult to reach the solubility limits of any of the base-phosphates. Or, two or more constituents may precipitate as mixed phosphates, necessitating the use of further separation methods.

Therefore, in accordance with the preferred method of isolating one base from mixtures containing a large number of bases, e. g. the naturally occurring mixtures of coal tar origin, the mixture of bases is first resolved into a number of fractions by distillation. Such a concentrated fraction, preferably containing from about 20% to 85% of the desired base, is then treated with phosphoric acid, preferably with a limited amount of phosphoric acid, to cause fractional precipitation of a single base-phosphate.

As indicated above, in forming the amine-phosphates a sufficient quantity of phosphoric acid to neutralize all bases present may be employed, whereupon two or three individual bases will frequently precipitate as insoluble phosphates, a greater number of other bases remaining dissolved, due to greater solubility of their phosphates, or because their individual concentrations are relatively low. The precipitated phosphates in such cases may be removed by filtration and the free amines liberated. The amines in this mixture may then be separated by careful fractionation, the fractionation being greatly simplified since the number of distillation components is thus limited to a few, generally two only. The mixture of two or more amines obtained as above described by converting the precipitated phosphates to free amines may, in some instances, be a desirable product in itself.

In some instances where sufficient phosphoric acid has been used to convert all the bases into phosphates, the base-phosphates tend, to greater or lesser extent, to form supersaturated solutions and, if accidental inoculation is carefully guarded against, single base-phosphates which form precipitates may be readily separated from these supersaturated solutions. For example, in a mixture containing 30% 2:6-lutidine and 60% of 3- and 4-picolines, the base mixture may be completely neutralized with phosphoric acid, and pure 2:6-lutidine phosphate thereafter precipitated therefrom by inoculation with a seed crystal of 2:6-lutidine phosphate. If accidental inoculation with 3- or 4-picoline phosphate crystals is carefully guarded against, these will remain in solution. Similarly, from a solution of 3- and 4-picoline phosphates, the predominating picoline phosphate may be precipitated in substantially pure form by inoculation with a seed crystal of that phosphate.

In the preferred method of carrying out my invention precipitation of a single compound is further assured by limiting the quantity of phosphoric acid added to the mixture of bases. The most suitable quantity of phosphoric acid for precipitating a single base may be determined by use of trial samples. Increasing quantities of phosphoric acid are added to such trial samples. The base-phosphate thus precipitated is converted to free base and is carefully fractionated to determine its purity. Completely dehydrated pure bases should be distillable within a fractionation range of not more than .1–.2° C. The most desirable quantity of phosphoric acid is the one which will give a single crystalline base-phosphate in optimum yield. Generally I consider it advisable to employ a somewhat lower quantity of phosphoric acid, thus sacrificing a little yield but insuring purity of the product. In some cases, e. g., where all except one of the phosphates form supersaturated solutions, purity of the product is not affected by the ratio of phosphoric acid to base used. However, a substantial excess of phosphoric acid over that required for precipitation of the base, I have found, decreases yield of crystalline base-phosphate, probably due to an additional solvent action.

In carrying out the precipitation of the base-phosphates, the crude base mixture plus an amount of methanol sufficient to make the subsequently formed slurry of crystals fluid enough to flow freely may be charged to a glass-lined kettle, heated and agitated. A predetermined amount of phosphoric acid may then be added to the charge, preferably over a period of several hours, and the temperature of the kettle jacket controlled to allow a gradual rise in temperature. Generally, it has been found suitable to allow the temperature of the mixture to rise from an initial value of about 35° C. to approximately 55° C. at the time all the acid has been added. Seed crystals may be added to inoculate the mass if crystallization does not start after the first 10–20% of the phosphoric acid has been added. In some cases, for example in precipitating 2:6- or 2:4-lutidine phosphates, it is desirable to agitate and cool the slurry of crystals for several hours after addition of the acid; in other cases, for example with 2:3 lutidine or 2:4:6-collidine phosphates, it may be desirable to cool the slurry of crystals only slightly or to filter or centrifuge it without prolonged agitation to reduce the possibility of precipitating undesired phosphates of other components present in the crude base mixture. The base-phosphates tend to form fine crystals which settle quite rapidly upon standing. Slow addition of the phosphoric acid, crystallization at temperatures of about 50° C., and slow cooling after the start of crystallization aid in increasing the crystal size.

Crystals of amine-phosphates suspended in uncombined bases or in a solution of these bases in an organic solvent are readily separated from the mother liquor by suction filtration or centrifuging. They are freed from adhering mother liquor by washing with suitable solvents. The washed phosphate crystals may be dried in trays; at 50–75° C., for example, a few hours drying have been found sufficient. Properly washed crystals are powdery when dried.

I have found the amine phosphates made by the process of my invention conform to the composition amine.$H_3PO_4$ and contain no water or alcohol of crystallization. These phosphates for the most part have melting points above about 120° C. and dissociate at elevated temperatures. The amine-phosphates prepared by the process of my invention are in the form of clean, attractive, crystalline products and constitute useful products in themselves; for example they may be employed directly for the manufacture of amine derivatives.

The free amine may be obtained by hydrolyzing the amine-phosphate; for example by treating the crystalline phosphate or a solution thereof with an aqueous alkaline material, e. g. caustic soda, lime or ammonia. I have found it advantageous to dissolve or suspend the phosphate in water and liberate the base by addition of about 1½ mols sodium hydroxide for every mol of phosphoric acid. The base is then extracted or permitted to settle and is separated from the aqueous solution of sodium phosphates. The isolated base contains dissolved water which may be removed, for example by digestion with solid sodium hydroxide, and the dehydrated base may then be subjected to a final straight distillation. A yield of 85–90% of theoretical may thus be obtained in commercial operation.

A number of heterocyclic amines of exceptional purity have thus been isolated. Certain bases of this nature heretofore have been rare or unfamiliar compounds and descriptions of their physical characteristics as found in scientific or technical literature are fragmentary or lacking in precision. In many cases I have been able to determine the properties of these compounds with greater accuracy than prior art sources of material have permitted.

The following examples are illustrative of the process of my invention. All parts are by weight.

*Example 1.*—Isolation of pure 2-picoline from a commercial sample of 2-picoline of specific gravity 0.95 and the following boiling range:

| Volume percent | Temp., °C. (760 mm.) |
|---|---|
| Start | 129.1 |
| 5 | 129.3 |
| 10 | 129.4 |
| 20 | 129.55 |
| 30 | 129.6 |
| 40 | 129.65 |
| 50 | 129.7 |
| 60 | 129.75 |
| 70 | 129.8 |
| 80 | 129.85 |
| 90 | 129.9 |
| 95 | 130.0 |
| Dry | 130.1 |

100 parts of the commercial 2-picoline were mixed with 160 parts of methanol. The bases were neutralized with approximately 1 mol equivalent of phosphoric acid, i. e. 115 parts of an acid having a strength of 85%. The methanol solution of base-phosphates was inoculated with crystals of 2-picoline phosphate, agitated and cooled. The bulk of the phosphate crystals separated out at room temperature; an additional yield separated on further cooling to about 5° C. The precipitate, consisting of glass-like needles, was separated on a suction filter and the crystals freed from adhering mother liquor by washing with 160 parts of methanol.

The 2-picoline phosphate, dried at a temperature below 100° C., was obtained in a yield of 146 parts, representing 70% of the picoline used.

Analysis showed that it contained 16.2% of phosphorus (determined by precipitation as magnesium ammonium phosphate and ignition to magnesium pyrophosphate) in close agreement with a calculated value of 16.23% for the formula $CH_3C_5H_4N.H_3PO_4$. The product was found to be readily soluble in water but sparingly so in methanol or ethanol, and its melting point was 119° C.

The 2-picoline phosphate was dissolved in 100 parts of water, and 35 parts of sodium hydroxide (as a 20% aqueous solution) was added while cooling the mixture. Liberated 2-picoline was extracted with three successive portions of 45 parts of benzene each. Pure 2-picoline was isolated from the benzene solution by fractional distillation. 55 parts of the pure base was obtained, a smaller quantity remaining in an intermediate distillation fraction.

The product had a water-white color which did not darken upon exposure, a specific gravity of 0.9316 at 25°/4° C., a refractive index, $n_D$, of 1.4993 at 25° C., and a boiling point of 129.4° C., 95% of the material distilling within a temperature range of 0.2° C.

The mother liquor was distilled to recover methanol, a syrupy base-phosphate remaining as still residue. This material was added to a succeeding batch of commercial 2-picoline which was to be treated for precipitation of 2-picoline phosphate. The syrupy distillate residue recovered from the distillation of the mother liquor represents an accumulation of residual non-crystallizing phosphates and may be worked up periodically for recovery of by-product bases by treatment with aqueous solutions of alkali hydroxide.

Instead of using methanol as a solvent, the picoline phosphate may be formed, as a heavy crystal mass, on mixing the crude picoline with 85% phosphoric acid. The crystals are of fair size, but coated with a syrupy mother liquor, which is most conveniently removed by alcohol washings.

*Example 2.*—Isolation of pure 2:6-lutidine from a mixture of bases of boiling range 140.4–144.1° C. (760 mm.), specific gravity 0.948 and approximate composition:

| | Percent |
|---|---|
| 3-picoline (B. Pt. 143.8° C.) | 40 |
| 4-picoline (B. Pt. 144.8° C.) | 20 |
| 2:6-lutidine (B. Pt. 143.8° C.) | 30 |
| Other isomeric bases | 10 |

6175 parts of the crude base mixture were agitated in a corrosion-resistant container having a cooling jacket. 2020 parts of 85% phosphoric acid were gradually added to the base mixture with constant cooling from the outside, the temperature of the reaction mixture not exceeding about 60° C. The mixture, which tended to form two layers, a lower layer consisting primarily of lutidine phosphate and an upper layer of primarily uncombined picolines, was inoculated with 2:6-lutidine phosphate crystals at an early stage of the reaction to prevent accumulation of supercooled phosphate. Inoculation with crystals of 3-picoline or 4-picoline phosphates was avoided so that these materials would remain in supersaturated solution. The reaction mixture was agitated for six hours and cooled to room temperature after addition of the phosphoric acid. The white crystals of 2:6-lutidine phosphate were removed by filtration, thoroughly washed with about 3860 parts of methanol and dried below 100° C. The yield of pure 2:6-lutidine phosphate was 2170 parts. The melting point of this phosphate was 172.5° C.

The mother liquor, which consists primarily of free bases but contains some dissolved phosphates and phosphoric acid, may be purified further by distillation to give a picoline mixture of materially reduced lutidine content. The distillation residue of liquid base-phosphates may be re-used directly as a source of phosphoric acid for the precipitation of 2:6-lutidine from a fresh batch of picolines-lutidine.

The dry lutidine phosphate was stirred into 2025 parts of 30% sodium hydroxide solution. The liberated base separated as a supernatent layer and was drawn off at a temperature of about 60° C. It contained dissolved water which was removed by digestion with solid sodium hydroxide. The residual dry base amounted to 1110 parts. It was freed from remaining traces of water and sodium hydroxide by distillation. The resulting 2:6-lutidine was water-white in color, did not darken upon exposure, had a clean, ethereal odor, 95% boiled through a temperature range of 0.2° C., at 143.8° C.; its specific gravity was 0.9286 at 25° C./4° C. and its refractive index, $n_D$, 1.4948 at 25° C.

*Example 3.*—Isolation of pure 2:4-lutidine from a mixture of bases of specific gravity 0.935 at 15.5° C. and the following boiling range:

| Volume per cent | Temp., °C. (760 mm.) |
|---|---|
| Start | 151.8 |
| 5 | 157.0 |
| 10 | 158.0 |
| 50 | 158.9 |
| 90 | 159.0 |
| 95 | 159.4 |
| Dry | 161.5 |

The material was estimated to contain approximately 60% of the 2:4-lutidine, the remainder consisting mainly of isomeric lutidines.

2500 parts of the crude base mixture and 2400 parts of methanol were agitated in a corrosion-resistant container surrounded by a cooling jacket. 2100 parts of 85% phosphoric acid were gradually stirred into the base mixture while cooling. A copious precipitate of 2:4-lutidine phosphate separated out after inoculation at an early stage of the phosphoric acid addition. The mixture was agitated for three hours at room temperature after the phosphoric acid had been added.

The phosphate crystals were removed by filtration and washed with a small amount of methanol. The washed crystals were dissolved in 1600 parts of methanol at about 65° C., reprecipitated by cooling to 30° C., filtered and washed with a small amount of methanol. The yield of dried crystalline product was 2300 parts. The 2:4-lutidine phosphate melted at 148° C.

The crystalline phosphate was added to a solution of 500 parts of sodium hydroxide in 1200 parts of water. The liberated base, after separation as a supernatant layer, was drawn off and dehydrated with solid sodium hydroxide. The yield of dry base was 1100 parts. An additional yield could be obtained by extraction of the aqueous solution of sodium phosphate with an organic solvent such as benzene. The dry base was freed from remaining traces of water and sodium hydroxide by distillation. The finished material was water-white, did not darken upon exposure, had a clean, ethereal odor faintly resembling nitrile, a boiling point of 158.3° C., a specific gravity of 0.9293 at 25° C./4° C. and a refractive index, $n_D$, of 1.4981 at 25° C.

*Example 4.*—Isolation of 2:3-lutidine from a mixture of isomeric and homologous bases of specific gravity 0.938 at 15.5° C. and the following boiling range:

| Volume per cent | Temp., °C. (760 mm.) |
|---|---|
| Start | 154.5 |
| 5 | 158.9 |
| 10 | 160.1 |
| 20 | 160.4 |
| 30 | 160.6 |
| 40 | 160.7 |
| 50 | 160.8 |
| 60 | 160.9 |
| 70 | 161.0 |
| 80 | 161.1 |
| 90 | 161.5 |
| 95 | 162.2 |
| Dry | 163.4 |

The material was estimated to contain approximately 20% of 2:3-lutidine; the remainder consisted of isomers, mainly the 2:4-lutidine and a smaller proportion of collidines.

1000 parts of the crude base mixture and 800 parts of methanol were agitated in a corrosion-resistant vessel provided with a cooling jacket. 250 parts of 85% phosphoric acid were slowly added. The temperature of the mixture was held between 50 and 60° C. The mixture was agitated for about two hours after addition of the phosphoric acid. The heavy crystalline precipitate of 2:3-lutidine phosphate was removed by filtration at 50° C. and washed with methanol. The yield of dry 2:3-lutidine phosphate was 330 parts, accounting for approximately 17% of the original mixture of bases. The melting point of this phosphate was 177° C. The 2:3-lutidine was obtained as a free base by treating the phosphate in the same manner as described in preceding examples. The final product was water-white, the color being stable upon exposure to air and light, had a clean, ethereal odor resembling pyridine, a boiling point of 161.4° C., a specific gravity of 0.9426 at 25°/4° C., and a refractive index, $n_D$, of 1.5061 at 25° C.

Isolation of pure 2:3-lutidine from a mixture of bases containing substantial quantities of the 2:4-isomer was made possible in this case by the use of a limited quantity of phosphoric acid. Residual bases obtained from the mother liquor from which the 2:3-lutidine phosphate was separated, enriched in 2:4-lutidine, may be subjected to further separation by fractional distillation and the fractions thus obtained may then be worked up to pure 2:4-lutidine and pure 2:3-lutidine respectively by treating with limited quantities of phosphoric acid.

*Example 5.*—Isolation of 2:3-lutidine from a mixture of isomeric and homologous bases of specific gravity 0.937 at 15.5° C. and having the following boiling range:

| Volume per cent | Temp., °C. (760 mm.) |
|---|---|
| Start | 149.2 |
| 5 | 153.3 |
| 10 | 158.8 |
| 20 | 161.2 |
| 30 | 161.6 |
| 40 | 161.8 |
| 50 | 162.0 |
| 60 | 162.3 |
| 70 | 162.5 |
| 80 | 162.8 |
| 90 | 163.3 |
| 95 | 164.1 |
| Dry | 166.8 |

The material was estimated to contain approximately 25% of the 2:3-lutidine; the remainder consisted mainly of 2:4-lutidine and smaller proportions of the 3:5-lutidine and of collidines.

1000 parts of the above tar-base mixture and 400 parts of methanol were mixed in a corrosion-resistant vessel and 254 parts of 75% phosphoric acid were slowly added with agitation and outside cooling. Crystallization of the acid phosphate was immediate and the mixture was slowly cooled with agitation to 33° C.

The 2:3-lutidine acid phosphate was removed by filtration, washed with 280 parts of methanol and air dried. The yield of phosphate was 384 parts, equivalent to 20% of the original tar bases charged. The 2:3-lutidine was converted to the free base as above described, dried with solid sodium hydroxide and distilled. The yield of 2:3-lutidine was 183 parts or 18.3% of the original base charged. The material had a boiling point of 161.4° C.

Uncombined bases may be recovered from the mother liquor of the 2:3-lutidine phosphate in the above process and separated by fractional distillation into (1) a fraction containing predominating quantities of 2:4-lutidine, (2) a small fraction containing 2:3-lutidine and (3) a small fraction predominating in 2:4:6-collidine. Such fractions may be worked up for these respective bases by treatment with optimum quantities of phosphoric acid.

*Example 6.*—Isolation of pure 2:4:6-collidine from a base mixture of specific gravity 0.929 at 15.5° C. and the following boiling range:

| Volume per cent | Temp., °C. (760 mm.) |
|---|---|
| Start | 150.0 |
| 5 | 167.6 |
| 10 | 168.5 |
| 20 | 168.8 |
| 30 | 169.0 |
| 40 | 169.1 |
| 50 | 169.2 |
| 60 | 169.3 |
| 70 | 169.5 |
| 80 | 169.7 |
| 90 | 170.1 |
| 95 | 170.2 |
| Dry | 172.1 |

It was estimated that the material contained from 30% to 35% 2:4:6-collidine. The remainder consisted predominantly of lower boiling homologs and isomers.

1500 parts of the above mixture of bases, about 1760 parts of methanol and 530 parts of 75% phosphoric acid were placed in a reaction vessel. The mixture was agitated and cooled to room temperature by outside cooling. The heavy crystalline precipitate of collidine phosphate was removed by filtration and washed with methanol. The product after drying at about 95° C. amounted to about 630 parts. The 2:4:6-collidine phosphate melted at 178° C.

The phosphate was treated with sodium hydroxide solution to liberate the free base. The base was dehydrated as described in previous examples and distilled, yielding 320 parts of pure 2:4:6-collidine. The product was water-white, the color remaining stable upon exposure to air and light, had a boiling point of 170.7° C., a clean, sweet odor resembling carrots, a specific gravity of 0.9128 at 25°/4° C. and a refractive index, $n_D$, of 1.4984 at 25° C.

The mother liquor obtained in the above process was admixed with 200 parts of 75% phosphoric acid and gave on cooling and filtration a second precipitate of base-phosphate. The free base obtained from this second crop of base-phosphate crystals, amounting to 105 parts, consisted of a mixture of 2:4:6-collidine and a smaller quantity of a lower boiling isomer. Careful fractional distillation eliminated this isomer from the 2:4:6-collidine.

*Example 7.*—Isolation of 2:4:6-collidine from a mixture of tar bases of specific gravity 0.929 at 15.5° C. and the following boiling range:

| Volume per cent | Temp., ° C. (760 mm.) |
|---|---|
| Start | 164.0 |
| 5 | 170.9 |
| 10 | 171.5 |
| 20 | 171.6 |
| 30 | 171.7 |
| 40 | 171.7 |
| 50 | 171.8 |
| 60 | 171.8 |
| 70 | 171.9 |
| 80 | 172.0 |
| 90 | 172.3 |
| 95 | 172.7 |
| Dry | 173.9 |

This material was estimated to contain approximately 20–25% of 2:4:6-collidine. The remainder consisted of higher boiling homologs and isomers.

1000 parts of the above tar base mixture and 600 parts of methanol were mixed in a corrosion-resistant vessel and 220 parts of 75% phosphoric acid were slowly stirred in. The mixture was cooled to about 30° C. and filtered. The collidine phosphate was washed with about 400 parts of methanol in small portions and air dried. The yield of crystalline phosphate was 288 parts (equivalent to 159 parts of 2:4:6-collidine).

The phosphate was treated to obtain free 2:4:6-collidine which was dried and distilled. 148 parts of pure 2:4:6-collidine having a boiling range of 170.6°–170.8° C. were obtained.

*Example 8.*—Isolation of pure quinaldine from a commercial grade of quinaldine of specific gravity of 1.064 at 20°/4° C. and the following boiling range:

| Volume per cent | Temp., ° C. (760 mm.) |
|---|---|
| Start | 245.0 |
| 5 | 246.3 |
| 10 | 246.5 |
| 20 | 246.5 |
| 30 | 246.9 |
| 40 | 247.1 |
| 50 | 247.4 |
| 60 | 247.8 |
| 70 | 248.0 |
| 80 | 248.2 |
| 90 | 248.2 |
| 95 | 248.7 |
| Dry | 251.0 |

The material was estimated to contain approximately 85% of quinaldine, the remainder comprising quinoline, isoquinoline and homologs.

143 parts of the crude base were dissolved in 240 parts of methanol. 160 parts of 85% phosphoric acid were dissolved in 120 parts of methanol. The phosphoric acid methanol solution was added gradually to the quinaldine solution, with cooling to remove the evolved heat of neutralization. Quinaldine phosphate separated as a heavy white precipitate. After agitation and cooling to room temperature the crystals were filtered and washed with 320 parts of methanol. The crystals were dried at 60° C., giving a yield of 188 parts of phosphate containing close to 112 parts of pure quinaldine or 78% of the base used. Quinaldine phosphate had a melting point of 229° C.

The phosphate so prepared was suspended in hot water and the quinaldine liberated by addition of 125 parts of a 30% aqueous solution of sodium hydroxide. The quinaldine separating as an upper layer was withdrawn, dehydrated and distilled under reduced pressure. The yield, aside from mechanical losses, was practically quantitative. The quinaldine had a melting point of −2° C., a boiling point of 247.0° C., 95% of the material distilling through a range of 0.2° C., a specific gravity of 1.0563 at 25°/4° C. and a refractive index, $n_D$, of 1.6072 at 25° C.

*Example 9.*—Isolation of pure quinaldine: 143 parts of commercial quinaldine such as that described in the preceding example were added to a solution of 120 parts of 85% phosphoric acid in 300 parts of water. Quinaldine phosphate precipitated immediately. The mixture was cooled to room temperature, and quinaldine phosphate was removed by filtration and the crystals were washed with a cooled aqueous solution containing approximately 5% by weight of phosphoric acid, about 400 parts being used in successive small portions. The quinaldine phosphate, dried, was obtained in a yield of 172 parts and contained approximately 102 parts of pure quinaldine.

*Example 10.*—Isolation of pure quinaldine from a crude quinaldine fraction of specific gravity 1.075 at 20°/15.5° C. and the following boiling range:

| Volume per cent | Temp., ° C. (760 mm.) |
|---|---|
| Start | 242.0 |
| 5 | 246.0 |
| 10 | 246.5 |
| 20 | 246.8 |
| 30 | 247.0 |
| 40 | 247.0 |
| 50 | 247.3 |
| 60 | 247.5 |
| 70 | 247.5 |
| 80 | 248.0 |
| 90 | 248.5 |
| 95 | 249.0 |
| Dry | 250.5 |

The material was estimated to contain approximately 40% quinaldine, the remainder consisting of isoquinoline and homologs of quinoline and isoquinoline.

230 parts of monosodium phosphate were dissolved in 375 parts of water in an enamel-lined kettle equipped with an agitator. 90 parts of 95% sulfuric acid were added to the mixture. The mixture was heated to 85° C., 110 parts of solvent naphtha added and 300 parts of the crude quinaldine fed in slowly with agitation. Agitation was continued after the charging for one hour with a little outside cooling until the temperature of the reaction mixture had dropped to about 70° C. The mixture was allowed to stand and cool to 40° C. with occasional stirring to promote the growth of crystals. The top layer of solvent naphtha containing unreacted bases was drawn off. The reaction mixture was centrifuged in a basket-type centrifuge to remove mother liquor. The quinaldine phosphate was washed first with 180 parts of 10% monosodium phosphate solution and then with 150 parts of solvent naphtha. The wet quinaldine phosphate cake was dispersed in 290 parts of water and the quinaldine liberated by the addition of 154 parts of 50% sodium hydroxide solution. The quinaldine separated as an upper layer, was given a small water wash, dehydrated and distilled under reduced pressure. There was obtained a yield of 36% of quinaldine having a melting point of −2° C., based on the original crude charge.

The mother liquor was neutralized with sodium hydroxide and the liberated bases drawn off. Careful fractionation indicated the absence of quinaldine and the presence of approximately 35% isoquinoline, the remainder consisting of homologous bases.

The solvent naphtha used for washing was treated with aqueous sulfuric acid to extract the bases therein and the bases thus extracted were liberated with sodium hydroxide. Fractionation showed these bases to be almost identical in composition to those liberated from the mother liquor.

*Example 11.*—Isolation of aniline from a crude aniline fraction of specific gravity 0.991 at 15.5° C. and the following boiling range:

| Volume per cent | Temp., ° C. (760 mm.) |
| --- | --- |
| 1st drop | 179.5 |
| 5 | 181.8 |
| 10 | 182.0 |
| 20 | 182.2 |
| 30 | 182.4 |
| 40 | 182.6 |
| 50 | 182.8 |
| 60 | 183.0 |
| 70 | 183.2 |
| 80 | 183.7 |
| 90 | 184.2 |
| 95 | 184.7 |
| Dry | 185.4 |

Analysis (by diazotization with standard sodium nitrite solution) showed the material to contain 51% aniline; the remainder being tri- and tetra-methyl pyridines.

500 parts of the tar base fraction described above were mixed with about 260 parts of toluene. To this was slowly added a mixture of 500 parts of water and 300 parts of 85% phosphoric acid. Crystals of aniline phosphate formed immediately and the mixture was cooled with stirring to room temperature. The phosphate was separated by filtering under suction and washed with toluene and cold water.

The aniline phosphate was dispersed in 250 parts of water and 125 parts of sodium hydroxide were added with outside cooling. The liberated aniline was separated, dehydrated and distilled. The boiling range was from 183.4°–184.1° C. (760 mm.), the yield being 223 parts or 45% of the crude charged. By diazotization with standard sodium nitrite solution the material was found to have a purity of 98%.

*Example 12.*—Isolation of aniline from a crude aniline fraction (the same starting material as in Example 11): 1400 parts of aqueous monosodium phosphate solution containing 400 parts of monosodium phosphate reclaimed from neutralization of a tar base acid phosphate were mixed with 175 parts of concentrated sulfuric acid. To this was added, with stirring and cooling, a mixture composed of 500 parts of the tar base fraction and about 260 parts of toluene. The aniline phosphate precipitated immediately; the mixture was cooled to 30° C. and suction filtered. The solid phosphate was washed with toluene and cold water. The yield of dry phosphate was 408 parts.

The aniline, liberated through neutralization of the phosphate with sodium hydroxide, was dried and fractionally distilled. The distillation range was the same as that of Example 11. Diazotization showed the material to be 98% pure. The yield based on the crude aniline fraction was 45%.

*Example 13.*—Isolation of pure 3-picoline from a mixture of specific gravity 0.96 at 15.5° C. and the following boiling range:

| Volume per cent | Temp., ° C. (760 mm.) |
| --- | --- |
| 0–5 | 129.1–142.1 |
| 5–30 | 142.1–144.1 |
| 30–95 | 144.1–145.0 |

The material was estimated to contain approximately 70% of 3-picoline, 25% of 4-picoline, the remaining 5% consisting of 2-picoline, 2:6-lutidine and 2:4-lutidine.

350 parts of this mixture of bases were mixed with 400 parts of methanol and 250 parts of 85% phosphoric acid. The mixture was cooled to room temperature and inoculated with pure 3-picoline phosphate crystals. On further cooling to about 0° C. a heavy mass of fine crystals of 3-picoline phosphate separated out. The crystals were removed on a suction filter and carefully washed with ice cold methanol, about 240 parts, to remove all traces of uncombined or unprecipitated bases. As a further precaution for purity of end product, the crystals were mixed with 160 parts of methanol and again filtered. The crystals were dried at 60°–70° C. and weighed 240 grams, corresponding to about 116 grams of pure 3-picoline, a yield of about 33% of the original mixture of bases used as starting material.

3-picoline phosphate has a limited solubility in methanol or ethanol, but is extremely soluble in water. The crystals obtained were dissolved in a little water and 3-picoline was liberated by addition of a 20% solution of sodium hydroxide containing approximately 65 parts of the anhydrous hydroxide. 3-picoline, substantially insoluble in the resulting solution of sodium phosphate, was separated as an upper layer, dehydrated and distilled, 107 parts of the 3-picoline being obtained. The product was water-white, the color being stable upon exposure, had a clean odor resembling nitrile, a boiling point of 143.8° C., a specific gravity of 0.9517 at 25°/4° C., and a refractive index, $n_D$, of 1.5048 at 25° C.

The mother liquor from the 3-picoline phosphate crystallization was freed from methanol by fractional distillation. Residual bases and base-phosphates were taken up in a little water and sodium hydroxide solution was added thereto to liberate the combined bases. The base mixture separating as an upper oily layer was removed, dehydrated and distilled.

*Example 14.*—Isolation of pure 3-picoline from a base mixture of specific gravity 0.962 at 15.5° C., and the following boiling range:

| Volume per cent | Temp., ° C. (760 mm.) |
|---|---|
| 0–15 | 136–143 |
| 15–30 | 143–146 |
| 30–95 | 146–147.1 |

The material was estimated to contain approximately 55% of 3-picoline, 25% of 4-picoline, 15% of pyrrole, the remaining 5% consisting of 2:6-lutidine and 2:4-lutidine.

1200 parts of the above base mixture and 400 parts of methanol were mixed, agitated and cooled to about 10° C. Gradually and under constant cooling 250 parts of 85% phosphoric acid were added, maintaining a temperature always below 25° C. to prevent resinification of the dissolved pyrrole. The mixture was inoculated with crystals of pure 3-picoline phosphate and further cooled to 0° C. over a period of about 12 hours. Precipitated 3-picoline phosphate was separated by filtration, washed with cold methanol, and dried at 70° C. The base phosphate had a melting point of 126.5° C.

Pure 3-picoline was prepared from the phosphate crystals by means of 20% sodium hydroxide solution, as previously described. The dehydrated base had the same characteristics as the 3-picoline obtained in the preceding example.

*Example 15.*—Isolation of pure 4-picoline from a mixture of specific gravity 0.954 at 15.5° C. and a boiling range of 142.5°–145.2° C. The material was estimated to contain approximately 80% of 4-picoline and 20% of 3-picoline, only negligible traces of moisture and lutidines being present.

350 parts of the base mixture, 400 parts of methanol and 325 parts of 85% phosphoric acid were mixed, cooled to about 15° C. and inoculated with crystals of pure 4-picoline phosphate. A fairly heavy precipitate of phosphate crystals formed in the course of about 2 hours. The crystals were separated by suction filtration and washed with about 200 parts of cold methanol. The phosphate crystals were dried at about 70° C., a yield of 390 parts being obtained. This yield of phosphate product was equivalent to about 190 parts of 4-picoline, corresponding to about 54% of the original mixture of bases used. The melting point of the product was 112° C.

4-picoline was liberated from the phosphate by addition of 20% sodium hydroxide solution, dehydrated and distilled, 170 parts of dry base being obtained. The product had a boiling range of 144.8°–144.85° C. (760 mm.), a specific gravity of 0.9500 at 25°/4° C. and a refractive index, $n_D$, of 1.5042 at 25° C.

The methanol may be reclaimed from the mother liquor and wash liquors by converting all uncombined bases into salts by addition of aqueous solutions of mineral acids and recovering the methanol by distillation. Residual bases in the distillation residue may be liberated by addition of sodium hydroxide.

*Example 16.*—Isolation of acridine from a mixture of higher boiling tar bases extracted from a creosote oil: The material consisted of a brownish viscous oil having a boiling range of 341°–369° C. (760 mm.).

65 parts of this material were mixed with about 52 parts of methanol and 12 parts of 75% phosphoric acid. A yellow precipitate formed immediately; the precipitate was removed by suction filtration, washed with methanol and dried. The yield of acridine phosphate was 34 parts.

Acridine was liberated by treating the phosphate with 20% sodium hydroxide solution. Crystals of free base were filtered by suction, washed with water and dried, giving a yield of 21 parts. After recrystallization from a petroleum solvent of boiling range 90°–130° C., a product of melting point 107°–108° C. was obtained.

*Example 17.*—Isolation of quinoline from a crude quinoline fraction of specific gravity 1.089 at 15.5° C. and the following boiling range:

| Volume per cent | Temp., ° C. (760 mm.) |
|---|---|
| Start | 236.0 |
| 5 | 236.4 |
| 10 | 236.5 |
| 20 | 236.6 |
| 30 | 236.6 |
| 40 | 236.7 |
| 50 | 236.8 |
| 60 | 236.8 |
| 70 | 236.9 |
| 80 | 237.0 |
| 90 | 237.1 |
| 95 | 237.2 |
| Dry | 237.5 |

100 parts of the crude quinoline were mixed with 160 parts of methanol and 100 parts of 85% phosphoric acid were run into the solution, whereupon a heavy granular precipitate was rapidly formed. The mixture was cooled to room temperature and filtered by suction. The crystals were washed with about 120 parts of methanol in small portions and dried at 65° C. A yield of 162 parts of the quinoline phosphate was obtained. The phosphate melted at 168.5° C.

300 parts of quinoline phosphate, formed as described above, were suspended in water and decomposed by adding a solution of 65 parts of sodium hydroxide in 150 parts of water at 60° C. The upper base layer was separated, washed with a little water and distilled. There were obtained 154 parts of pure quinoline of boiling point 237.5°–237.7° C. (760 mm.), specific gravity 1.094 at 20°/4° C., refractive index, $n_D$, 1.6267 at 20° C., and melting point −19° C.

The pure dry quinoline had a clean, sweet odor and remained light-colored for an extended time in contrast to the crude material which had a pungent odor and discolored rapidly after distillation.

*Example 18.*—Purification of isoquinoline: An impure isoquinoline fraction (containing up to about 85% isoquinoline) may be prepared by methods of fractional distillation. I have found that upon addition of a limited amount of phosphoric acid, instead of precipitating isoquinoline phosphate, other bases occurring in smaller proportions, for example quinaldine, form highly insoluble phosphates and are precipitated in mixture with isoquinoline. A large part of the admixed bases in the isoquinoline fraction may therefore be removed by preferential precipitation with a small proportion of phosphoric acid, leaving the residual oil greatly enriched in isoquinoline. This example illustrates another application of my invention, namely, the precipitation of phosphates of bases present in minor proportions in a base mixture in order substantially to free the tar base fraction from those bases. This application of my invention is illustrated by the following procedure:

500 parts of an isoquinoline fraction, specific gravity 1.094 at 15.4/4° C., melting point 17° C. and boiling range 241.4°–243.3° C., were mixed with 150 parts of methanol and 112 parts of 85% phosphoric acid. The acid corresponded to approximately 25 mol percent of the total bases present. A heavy precipitate of base-phosphate separated on standing at room temperature. The precipitate was isolated by filtration on a suction filter and washing with methanol. The precipitated base-phosphates were dissolved in water and the bases liberated by addition of sodium hydroxide. The mixture of bases, dehydrated and distilled, had a melting point of 6° C.

The mother liquor and the methanol wash solutions were fractionally distilled to remove methanol. The residual tar base thus recovered was extracted with a dilute aqueous sodium hydroxide solution to remove phosphoric acid. The oil was separated from water and distilled, 280 parts of purified isoquinoline being obtained.

Since certain changes may be made in carrying out the above process without departing from the scope of the invention, it is intended that all matter contained in the above description shall be interpreted as illustrative and not in a limiting sense.

I claim:

1. In a process for isolating a coal tar base from a mixture containing material amounts of a plurality of such bases, the steps which comprise reacting said mixture with phosphoric acid in a medium in which the saturation solubility of the phosphate of the base to be isolated is low to form the phosphate of said base together with other base phosphates, inoculating the reaction mixture with a crystal of the phosphate of the base to be isolated to cause precipitation of said phosphate from the reaction mixture, separating the base phosphate thus precipitated, and converting the phosphate to the free base.

2. In a process for separating a coal tar base from a mixture containing material amounts of a plurality of coal tar bases, the step which comprises reacting said mixture with phosphoric acid in the presence of a diluent selected from the group methanol and ethanol to precipitate the phosphate of the base to be separated.

3. In a process for separating coal tar nitrogen bases from a mixture containing material amounts of a plurality of such bases, the steps which comprise converting bases in said mixture to their corresponding phosphates, separating insoluble phosphates from soluble phosphates in the resulting mixture, and using soluble base phosphates thus recovered to precipitate insoluble base phosphates in a succeeding batch of said first mentioned mixture of coal tar nitrogen bases.

4. A process for isolating a pure pyridine homolog from a mixture containing material amounts of a plurality of such homologs, comprising reacting said mixture with phosphoric acid to form phosphates of a plurality of the homologous bases, cooling the reaction mixture and inoculating it with a crystal of a selected pyridine homolog phosphate to bring about the precipitation of said said selected pyridine homolog phosphate only.

5. A process for isolating quinaldine from a mixture containing material amounts of a plurality of coal tar bases including quinaldine, which comprises treating the base mixture to form phosphates of a plurality of the bases and to precipitate quinaldine phosphate from said mixture, separating the precipitated quinaldine phosphate from soluble base phosphates, and converting the separated phosphate to free quinaldine.

6. In a process for separating picoline from a mixture containing material amounts of a plurality of coal tar bases including picoline, the step which comprises reacting said mixture with phosphoric acid in the presence of a diluent selected from the group methanol and ethanol to form phosphates of a plurality of said bases and to precipitate only picoline phosphate.

7. In a process for separating methyl quinoline from a mixture containing material amounts of a plurality of coal tar bases including methyl quinoline, the step which comprises reacting said mixture with phosphoric acid in the presence of a diluent selected from the group methanol and ethanol to form phosphates of a plurality of said bases and to precipitate only methyl quinoline phosphate.

8. In a process for separating lutidine from a mixture containing material amounts of a plurality of coal tar bases including lutidine, the step which comprises reacting said mixture with phosphoric acid in the presence of a diluent selected from the group methanol and ethanol to form phosphates of a plurality of said bases and to precipitate only lutidine phosphate.

9. In a process for separating a coal tar base from a narrow boiling mixture containing material amounts of a plurality of coal tar bases, the steps which comprise reacting said mixture with phosphoric acid in the presence of a diluent selected from the group methanol and ethanol to form phosphates of a plurality of said bases and to precipitate the phosphate of the base to be separated, and thereafter removing the precipitated base phosphate from the reaction mixture.

10. In a process for separating a base from a narrow boiling mixture containing material amounts of a plurality of heterocyclic nitrogen bases of coal tar origin, the steps which comprise reacting said mixture with phosphoric acid in the presence of a diluent selected from the group methanol and ethanol to form phosphates of a plurality of said bases and to precipitate the phosphate of the base to be separated, and thereafter separating the precipitated base phosphate from the reaction mixture containing soluble base phosphate.

11. A method of purifying a mixture of coal tar bases containing a major proportion of isoquinoline and at least one other close-boiling coal tar base which comprises treating the mixture with phosphoric acid to precipitate as phosphate a base present in minor proportion in said mixture, and thereafter separating the precipitated base phosphate to obtain a product enriched in isoquinoline.

12. A process for separating a pyridine homolog from a mixture containing material amounts of a plurality of close-boiling pyridine homologs of the class occurring in coal tar, which comprises reacting said mixture with phosphoric acid to precipitate one of said pyridine homologs preferentially as base phosphate, and separating the base phosphate thus precipitated.

13. A process for separating one of the bases 3-picoline, 4-picoline and 2,6-lutidine from a mixture containing material amounts of at least two of these bases, comprising precipitating said base preferentially from the mixture in the form of its phosphate, and separating the base phosphate thus precipitated.

14. A process for separating 3-picoline from a mixture containing material amounts of 3-picoline and like-boiling heterocyclic nitrogen compounds, in which mixture 3-picoline is present in predominating amount and 2,6-lutidine constitutes not more than about 5% by weight of the bases present, which comprises preferentially precipitating 3-picoline from said mixture in the form of its phosphate, and separating the precipitated 3-picoline phosphate.

15. A process for separating 2,6-lutidine from a mixture thereof with a material amount of at least one of the bases 3-picoline and 4-picoline, 2,6-lutidine comprising more than 14% by weight of the base mixture, which comprises preferentially precipitating 2,6-lutidine phosphate from said mixture, and separating the precipitated 2,6-lutidine phosphate.

KARL HENRY ENGEL.